(12) United States Patent
Allen et al.

(10) Patent No.: US 8,449,701 B2
(45) Date of Patent: May 28, 2013

(54) ACOUSTIC BAFFLE MEMBERS AND METHODS FOR APPLYING ACOUSTIC BAFFLES IN CAVITIES

(75) Inventors: Mark P. Allen, Bruce Township, MI (US); Tao Chen, Hubei (CN); Jay M. Tudor, Goodrich, MI (US); Matthew J. Turpin, Linden, MI (US); Thomas Mettler, Uetliburg (CH); Bin Chen, Shanghai (CN); Xiaochun Liu, Shanghai (CN); Xiaojun Yang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 196 days.

(21) Appl. No.: 13/129,136

(22) PCT Filed: Nov. 26, 2008

(86) PCT No.: PCT/CN2008/073201
§ 371 (c)(1),
(2), (4) Date: Aug. 3, 2011

(87) PCT Pub. No.: WO2010/060241
PCT Pub. Date: Jun. 3, 2010

(65) Prior Publication Data
US 2011/0277911 A1 Nov. 17, 2011

(51) Int. Cl.
*B29C 44/12* (2006.01)
*B32B 3/24* (2006.01)
*B32B 3/30* (2006.01)

(52) U.S. Cl.
USPC ............ 156/79; 428/137; 428/158; 428/167; 428/304.4; 296/187.02; 264/46.6

(58) Field of Classification Search
USPC ....... 156/79; 296/187.02; 264/46.6; 428/137, 428/158, 167, 304.4, 318.4
See application file for complete search history.

(56) References Cited

U.S. PATENT DOCUMENTS

| | | | |
|---|---|---|---|
| 4,759,000 | A | 7/1988 | Reitz |
| 5,373,027 | A | 12/1994 | Hanley |
| 5,504,281 | A | 4/1996 | Whitney |
| 5,506,025 | A | 4/1996 | Otto |
| 6,093,358 | A | 7/2000 | Schiewe |
| 6,114,004 | A | 9/2000 | Cydzik |
| 6,146,565 | A | 11/2000 | Keller |
| 6,382,635 | B1 | 5/2002 | Fitzgerald |
| 2005/0150720 | A1 | 7/2005 | Tudor |
| 2006/0008615 | A1 | 1/2006 | Muteau |

(Continued)

FOREIGN PATENT DOCUMENTS

| | | | |
|---|---|---|---|
| EP | 1362683 | A | 8/2008 |
| WO | 08043385 | A | 4/2008 |

*Primary Examiner* — Michael Tolin
(74) *Attorney, Agent, or Firm* — Gary C Cohn PLLC

(57) ABSTRACT

An uncured acoustic absorbing member for cavity sealing comprises a thermally inert carrier (8, 28) and a thermally expandable material (6, 26) applied to the carrier (8, 28). The carrier (8, 28) contains openings (3) which become covered when the thermally expandable material (6, 26) is expanded to seal the cavity. The thermally expandable material (6, 26) may be in the form of substantially discontinuous segments (25) having an area in the range of 0.25 to 400 mm$^2$. The substantially discontinuous segments (25) provide a highly uniform expansion of the material when it is thermally expanded. The acoustic absorbing members are particularly useful for sealing automotive cavities to provide acoustical abatement and to prevent the entry of fluids into the cavity.

4 Claims, 3 Drawing Sheets

U.S. PATENT DOCUMENTS

| | | | |
|---|---|---|---|
| 2006/0057333 A1* | 3/2006 | Brahim | 428/138 |
| 2006/0065483 A1 | 3/2006 | Thomas | |
| 2007/0045866 A1 | 3/2007 | Gray | |
| 2007/0265364 A1 | 11/2007 | Oner-Deliormanli | |
| 2007/0281523 A1* | 12/2007 | Riley | 439/157 |
| 2009/0026008 A1 | 1/2009 | Krus | |

* cited by examiner

FIGURE 1
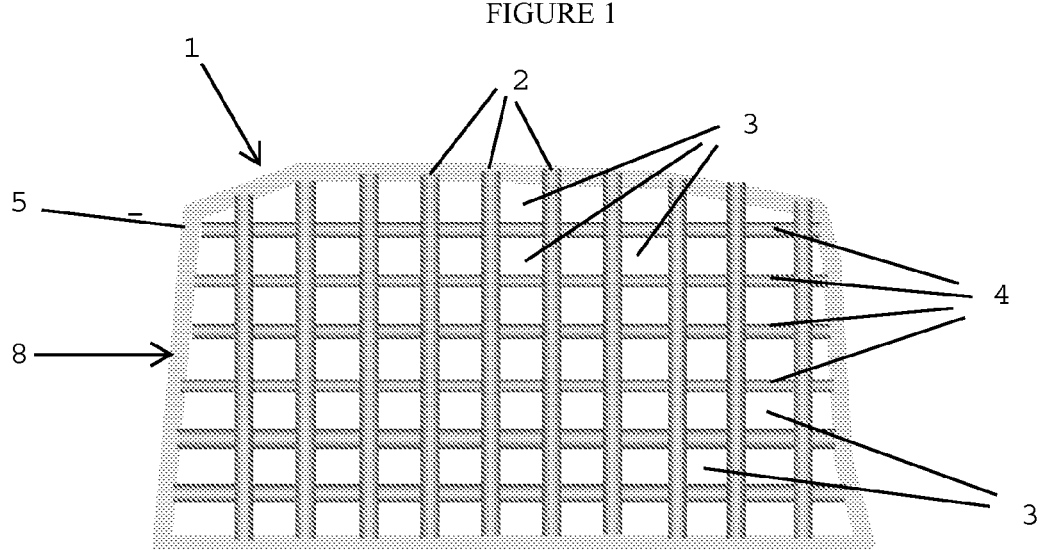
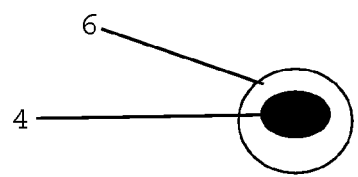
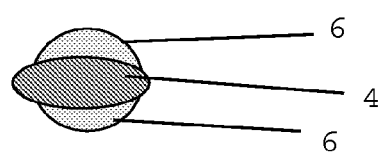
FIGURE 1A      FIGURE 1B

ACOUSTIC BAFFLE MEMBERS AND METHODS FOR APPLYING ACOUSTIC BAFFLES IN CAVITIES

This invention relates to acoustic baffles that have a layer of a thermally expandable material, and to methods for providing acoustic baffling in cavities.

It is often desirable to seal structural cavities, particularly in automobiles and other vehicles, to reduce the transmission of noise or vibration through the cavity or to prevent fluids from entering the cavity. One way of doing this is to introduce an expandable material into the cavity, and then to cause the expandable material to expand to form a foam which seals the cavity. The foam generally will be a good absorber of sound or other vibrations, particularly if it is a somewhat soft material.

The expandable material is often first applied to a carrier, which is then inserted into the cavity. The carrier provides some initial structural support, and can provide a means for affixing the expandable position into the portion of the cavity where it is wanted. Examples of baffle materials of this type are described, for example, in WO 93/37506, WO 00/03894, WO 01/30906, WO 02/26549, WO 08/043,385, U.S. Pat. No. 5,385,951, EP 452 527A1, EP 1 362 683 B1 and EP 457 928 A1.

The reflective properties of the carrier material used in typical inserts can result in noise within the cavity reflecting off the carrier instead of being absorbed by a foam material. Many baffles consist of either a hard polymeric or metal carrier with the edge of the carrier covered with an expandable material. Upon cure, only the outer exterior of the cavity wall contains absorptive material—the central cross section of the cavity is blocked with a carrier that can reflect sound. A more effective baffle would include a soft polymer over the entire surface of the carrier instead of only at the edges.

Another type of baffle includes a carrier covered with a die cut or injection molded polymer on the top surface. The bottom carrier surface is uncovered and will exhibit poor sound absorption due to the reflection of noise by the uncovered carrier surface. If a foamable material were attached to the bottom surface, it would sag off during the expansion step and provide an uneven foam surface. A more desirable offering would include an acoustical foam on both the top and bottom of the carrier.

In automotive applications, the acoustic baffle is typically inserted into the cavity of a part which must be coated or painted. These automotive coating are usually baked, and it is efficient to expand the expandable material in the baffle at the same time that the coating undergoes the bake cure. The problem with doing this is that the baffle generally blocks off the cavity even before the expansion step takes place. This prevents the coating from penetrating into the cavity and coating its internal surfaces. So a way is needed to allow the coating to penetrate into the cavity, and to still seal the cavity.

An alternative type of baffle which allows for this is comprised of a porous clam shell which holds an expandable material in the cavity formed by the clam shell (EP 1 362 683 B1). Upon expansion, the cavity becomes filled with a foam material that also encapsulates the clam shell carrier. These parts are high in mass. In addition, the amount of assembly processes and manufacturing cost is high—the clamshell carrier must be injection molded, the expandable material must be injection molded or die cut, and these components then must be assembled manually.

Another problem with acoustic baffles is that the expandable material tends to expand non-uniformly. As a result, the expanded material may be thicker in some areas than others. This leads to a loss of effectiveness in acoustic properties, as the acoustic properties of the baffle tend to be determined by the thinnest areas of the expanded material. In some cases the expansion becomes somewhat directional, which again leads to nonconformities and a loss of effectiveness. It would be desired to provide for more uniform expansion of the expandable material in these baffles.

The present invention is in one aspect an uncured acoustic absorbing member comprising a thermally inert carrier and a thermally expandable material applied to the carrier, wherein the carrier includes a wall portion having first and second opposing sides and openings extending through the wall portion from the first opposing side to the second opposing side, wherein said openings have a maximum dimension of from 0.5 to 20 mm and wherein said openings constitute in the aggregate from 10 to 85% of the surface area of the wall portion, and wherein the thermally expandable material is applied to both of said opposing sides of the carrier such that said openings in the carrier are not filled by the thermally expandable material, and further wherein said thermally expandable material expands by foaming when heated to a temperature in the range of from 120 to 250° C. to form an expanded foam on both sides of the carrier that covers at least 99% of the area of said openings in the carrier.

The invention is also in certain embodiments a method of applying acoustical baffling to a cavity, comprising a) positioning the uncured acoustic absorbing member of the first aspect transversely within the cavity, and b) heating the acoustic absorbing member to a temperature of from 120 to 250° C. for a time sufficient for the thermally expandable material to expand to at least 400% of its initial volume and produce on each opposing side of the carrier a cured foam that covers substantially the entire surface area of said opposing side of the carrier and fills at least 99% of the area of said openings in the carrier.

The openings permit fluids to pass through the member before the thermally expandable material is expanded, while providing for a continuous acoustic barrier and good cavity sealing after the material has been expanded. Therefore, in especially preferred embodiments of the foregoing process, after step a), a coating or corrosion treatment is applied to the interior of said cavity by passing at least a portion of the coating through said openings in said acoustic baffle member or by draining at least a portion of the coating or corrosion treatment through said openings in said acoustic baffle member, or both, and said coating undergoes a thermal cure during step b).

The openings also permit the flow of gas through the member during the thermal expansion step. This can improve heat transfer, which in turn can speed the expansion of the thermally expandable material and promote greater uniformity of the expansion.

Another benefit of this aspect of the invention is that the carrier can be very low in mass and of a simple design. Decreasing the mass of the carrier is beneficial in that less energy is expended on heating the carrier during the thermal expansion set. As a result, the thermally expandable material can expand in less time and more uniformly. Simple carrier designs can decrease costs. In many cases, the carrier can assume a simple planar form with openings and optionally a border and/or certain surface features such as raised areas, as described more fully below.

In a second aspect, this invention is an uncured acoustic absorbing member comprising a thermally expandable material in the form of a wall having first and second opposing sides and openings extending through the wall from the first opposing side to the second opposing side, wherein said openings have a maximum dimension of from 0.5 to 20 mm and wherein said openings constitute in the aggregate from 10 to 75% of the surface area of the wall portion, and wherein said thermally expandable material expands by foaming when heated to a temperature in the range of from 120 to 250° C. to form an expanded foam in which said openings are closed by the expansion of the thermally expandable material.

The invention is also in certain embodiments a method of applying acoustical baffling to a cavity, comprising a) positioning the uncured acoustic absorbing member of the second aspect transversely within the cavity, and b) heating the acoustic absorbing member to a temperature of from 120 to 250° C. for a time sufficient for the thermally expandable material to expand to at least 400% of its initial volume and produce a cured foam such that the openings in the wall are closed by the expansion of the thermally expandable material.

In a third aspect, the present invention is an uncured acoustic absorbing member comprising a thermally inert carrier and, applied to the carrier, a thermally expandable material which cures and expands to at least 400% of its initial volume when heated to a temperature in the range of from 120 to 250° C. to form an expanded foam, wherein the carrier includes a wall portion having opposing surfaces, at least one of which opposing surfaces includes raised areas which divide said surface into substantially discontinuous sections that each have a surface area of from 0.25 to 400 mm$^2$, and wherein at least a portion of the thermally expandable material is applied to at least one surface of the carrier within said substantially discontinuous sections defined by said raised areas to form a discontinuous layer of said thermally expandable material on said surface of the carrier.

The present invention is also a method of applying acoustical baffling to a cavity, comprising a) positioning the uncured acoustic absorbing member of the third aspect of the invention transversely within said cavity, and b) heating the acoustic absorbing member to a temperature of from 120 to 250° C. for a time sufficient for the discontinuous layer of the thermally expandable material to expand to at least 400% of its initial volume and produce on at least one side of the carrier a cured foam that covers substantially the entire surface area of said solid side of the carrier.

The discontinuous thermally expandable material of the third aspect of the invention has been found to expand in a highly uniform manner. The more uniform expansion often reduces the amount of the wall surface area that is uncovered with foam. This provides more consistent acoustical performance, better cavity sealing and in addition can reduce the amount of the thermally expandable material that is needed to obtain good acoustical and sealing performance.

FIG. 1 is a frontal view of an uncured acoustic absorbing member of the invention.

FIG. 1A is a detail of a transverse member of an uncured acoustic absorbing member of the invention.

FIG. 1B is a detail of an alternate embodiment of a transverse member of an uncured acoustic absorbing member of the invention.

Figures 2, 2A, 2B:
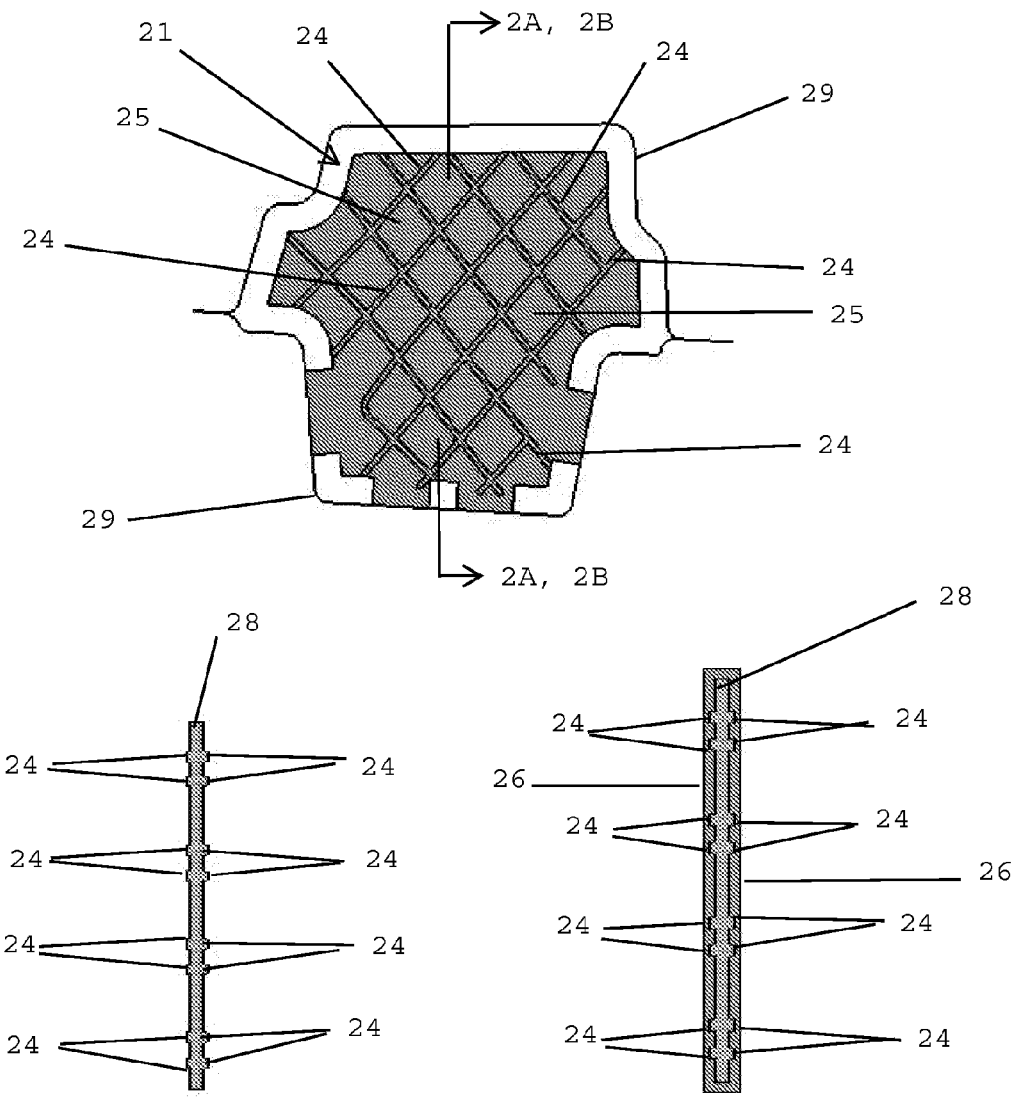
FIG. 2 is a frontal view of a second embodiment of an uncured acoustic absorbing member of the invention.
FIG. 2A is a side view of a carrier for the uncured acoustic absorbing member shown in FIG. 2.
FIG. 2B is a side view of the uncured acoustic absorbing member shown in FIG. 2.

Turning to FIGS. 1, 1A and 1B, acoustic absorbing baffle 1 includes carrier 8. In FIG. 1, carrier 8 is in the form of a lattice that comprises periphery 5, vertical members 2 and transverse members 4. Vertical members 2 and transverse members 4 define the wall portion of carrier 8. Vertical members 2 and transverse members 4 are in contact with each other at their respective points of intersection and, together with periphery 5, define openings 3 which permeate carrier 8. Thermally expandable material 6 is applied to at least one side of the wall formed by vertical members 2 and transverse members 4.

FIGS. 1A and 1B illustrate alternative approaches to applying thermally expandable material 6 to carrier 8. In the embodiment illustrated in FIG. 1A, thermally expandable material 6 encapsulates an illustrative transverse member 4, in effect forming thermally expandable material 6 onto each opposing side of the wall defined by vertical members 2 and transverse members 4. In such an embodiment, thermally expandable material 6 can similarly encapsulate vertical members 2. In alternative embodiments, vertical members 2 and transverse members 4 can be only partially coated with thermally expandable material 6. An example of such an embodiment is shown in FIG. 1B, in which two opposing sides of transverse member 4 (which correspond to first and second opposing sides of the wall portion of carrier 8) are separately coated with thermally expandable material 6. Vertical members 6 can be similarly coated in this embodiment.

In an alternative embodiment, carrier 8 is itself made of the thermally expandable material. In this case, vertical members 2 and transverse members 4 (and optionally periphery 5) are made of the thermally expandable material, and no additional layer 6 is necessary.

FIGS. 2, 2A and 2B illustrate another aspect of the invention. In FIG. 2, acoustic absorbing member 21 is shown positioned within a cavity defined by structural members 29. Acoustic absorbing member 21 includes carrier 28 and thermally expandable material 26. Carrier 28 includes wall 22. Wall 22 includes first and second opposing sides, only one of which is visible in FIG. 2. Each side of wall 22 includes multiple raised areas 24, which are shown in FIGS. 2, 2A and 24 as a series of intersecting ridges. Raised areas 24 divide each surface of wall 22 into substantially discontinuous sections 25. Substantially discontinuous sections 25 each have a surface area of from 0.25 to 400 mm$^2$.

Figure 3:
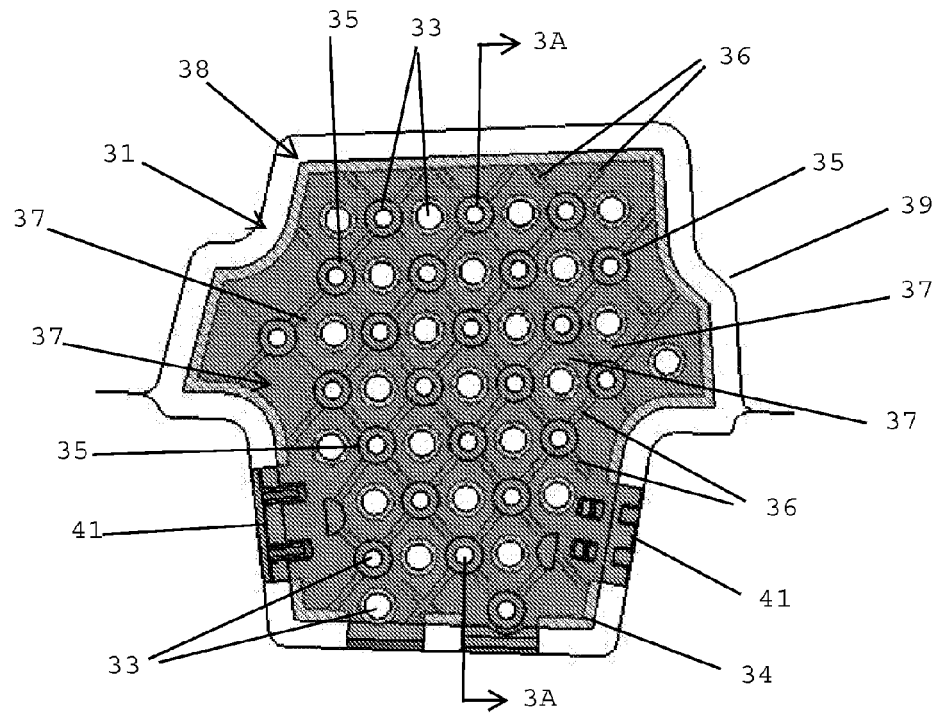
FIG. 3 is a frontal view of a third embodiment of an uncured acoustic absorbing member of the invention.

For purposes of this invention, sections such as sections 25 in FIG. 2 are "substantially discontinuous" if (1) they are completely separated from adjacent sections through raised areas, such as is shown in FIG. 3 or (2) if they are separated from adjacent sections by raised areas that extend along at least 50%, more preferably at least 75%, of the periphery of the section. Small connections between adjacent sections are acceptable, although complete separation between adjacent sections is generally preferred. Thus, for example, ridges 24 may be discontinuous in some embodiments, forming, for example, lines of alternating raised and flat areas, so that adjacent sections are connected at the points where the flat areas exist in the ridge lines.

FIG. 2A shows carrier 28 in cross-section, taken along lines 2A-2A. FIG. 2B shows acoustic absorbing member 21 in cross-section, and illustrates how thermally expandable material 26 is applied to carrier 28. Thermally expandable material 26 is applied to the opposing sides of wall 22, within sections 25. Ridges 24 remain uncoated or, if coated, are coated to a very small thickness, not to exceed 50%, preferably not to exceed 25%, of the height of ridges 24. In the particular embodiment shown in FIG. 2B, thermally expandable material 26 is somewhat thicker than the height of ridges 24. It is preferred to leave ridges 24 uncoated.

Figure 3A:
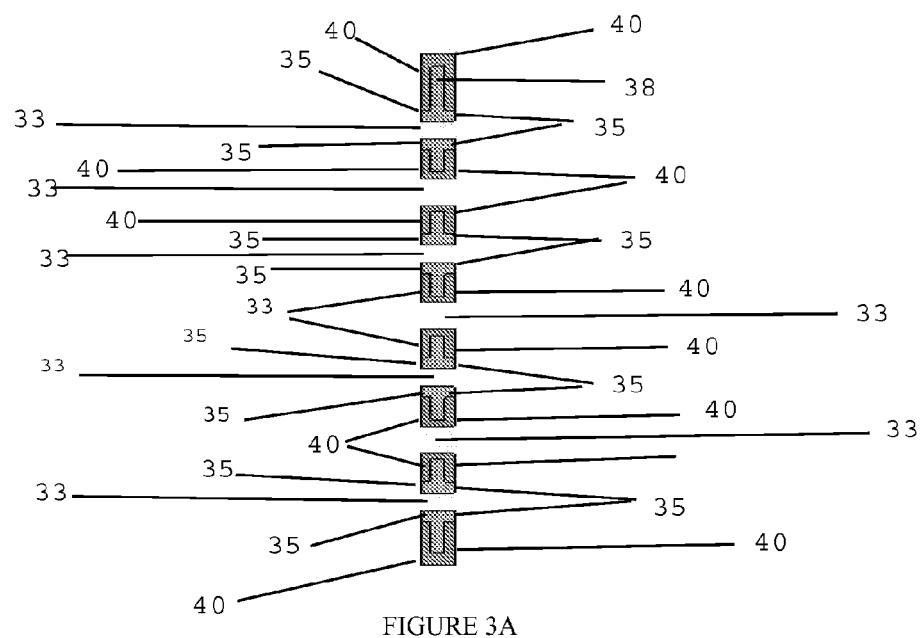
FIG. 3A is a side view of the uncured acoustic absorbing member shown in FIG. 3.

An embodiment combining both aspects of the invention is shown in FIGS. 3 and 3A. Acoustic absorbing member 31 is shown positioned within a cavity defined by structural members 39. Carrier 38 includes wall 32 and periphery 34. Wall 32 has first and second opposing sides, only one of which is visible in FIG. 1. As shown, wall 32 contains openings 33, which, in the embodiment shown, are mainly arranged in a regular geometric pattern. In the embodiment shown in FIGS. 3 and 3A, thermally expandable material 40 is applied to each side of wall 32, covering essentially the entire surface of wall 32 except for openings 33, which remain unfilled, and periphery 34. It is also within the scope of the invention to apply thermally expandable material to periphery 34 of carrier 38.

The carrier shown in FIGS. 3 and 3A also contains raised areas. In FIGS. 3 and 3A, the raised areas take the form of intersecting ridges 36 and raised opening borders 35. Ridges 36 and raised opening borders 35 together define sections 37. In the embodiment shown, the height of ridges 36 and raised opening borders 35 is approximately equal to the thickness of thermally expandable material 40. As before, thermally expandable material 40 may have a thickness less than or somewhat greater than the height of ridges 36 and raised opening borders 35. In the first and second aspects of the invention, the openings, such as openings 3 in FIG. 1 and openings 33 in FIG. 3, each have an area of from 0.8 to 320 mm$^2$. Preferably, the openings each have an area of from 3 to 80 mm$^2$. The shape of the openings is not generally critical to the invention and therefore can be selected arbitrarily. Therefore the openings can be circular, elliptical, polygonal such as a triangular, rectangular, hexagonal, "crescent"-shaped, "star"-shaped or some other configuration. The openings in a particular case do not need to be all the same size or the same shape. The openings in the aggregate may cover from about 10 to about 85%, preferably from 20 to 60% of the surface area of the wall of the baffle. In FIG. 1, the openings 3 in the aggregate cover approximately 60-75% of the surface area of wall portion of carrier 8. In FIG. 3, openings 33 in the aggregate cover approximately 20-25% of the total surface area of wall 32.

The particular arrangement of the openings also is not especially critical. As shown in FIGS. 1 and 3, openings 3 and 33 are arranged in patterns of aligned columns and rows. Nearly any alternative pattern can be used, including a random arrangement of the openings, consistent with the mechanical integrity of the baffle prior to expansion of the thermally expandable material. It may be advantageous in some cases to locate at least some of the openings in defined places on the wall portion of the carrier, to better provide drainage of fluids or for other reasons.

In the third aspect of the invention, the raised areas, such as raised areas 24 in FIG. 2, ridges 36 in FIG. 3 and raised opening borders 35 in FIG. 3, may be shorter than, equal to or taller than the thickness of the thermally expandable material. Most preferably, such raised areas are substantially equal (+/−0.5 mm) in height to the thickness of thermally expandable material 26. In absolute terms, the thickness of the raised areas are preferably from about 0.5 to 20 mm, preferably from 1 to 12 mm and even more preferably from 1 to 6 mm. The substantially discontinuous sections such as those indicated by reference numeral 25 in FIG. 2 and reference numeral 37 in FIG. 3 each have a surface area of from 0.25 to 400 mm$^2$, preferably from 1 to 100 mm$^2$.

In the first and second aspects of the invention, the thickness of the thermally expandable material (such as indicated by reference numerals 6, 26 and 40 in FIGS. 1A, 2B and 3A, respectively) is selected together with the size and number of openings and the expansion characteristics of the thermally expandable material such that upon expansion, the thermally expandable material expands to fill at least 99%, preferably 100% of the aggregate area of openings (such as openings 3 and 33 in FIGS. 1 and 3, respectively). The thermally expandable material must be thick enough, given the size and number of the openings and the expansion characteristics of the material, that when the material is expanded, it can fill at least 99% of the aggregate surface area of the openings. During expansion, a thermally expandable material may expand to at least 400% of its initial volume (i.e., to a volume that is 4 times that of the unexpanded layer) to as much as 3500% of its initial volume. A preferred thermally expandable material may expand to 1000 to 3000% of its initial volume, or to 2000 to 3000% of its initial volume.

In all aspects of the invention, the thickness of the thermally expandable material prior to expansion is generally in the range of from 0.5 to 12 mm, preferably from 1 to 6 mm.

The acoustic absorbing baffle of any aspect of the invention may include additional functional features. Among them are attachment means such as clips 41 in FIG. 3, which can function to temporarily secure the baffle into place in a structure until such time as the thermally expanded material is expanded. In many cases, the thermally expanded material will serve to adhere the baffle in place once it has been expanded.

The carrier used in various aspects of the invention (such as carriers 8, 28 and 38) can be made of any material that has enough mechanical strength to hold its shape and support the weight of the layer(s) of thermally expandable material. The material used to make the carrier is also thermally inert, by which it is meant that it does not melt, deform or decompose under the conditions at which the thermally expandable material is expanded. For example, the carrier may be made of a metal, ceramic or an organic polymer. An organic polymer may be reinforced with fibers or other reinforcing materials if necessary to provide it with the requisite mechanical properties. Organic polymers that can be used to make carrier 8 include high-melting thermoplastics such as polyamides, polyimides, certain polyesters. By "high-melting" it is meant that the thermoplastic has a melting or softening temperature higher than the highest temperature encountered during the expansion of thermally expandable material.

The thermally expandable material is made of a polymeric or resinous composition that is a solid or highly viscous material at room temperature (~25° C.), and so can be formed into a layer which is self-supporting (if no carrier is used), or, when a carrier is used, adheres to the carrier or can be adhered to the carrier though some intermediate adhesive layer. It is also possible to mechanically affix the thermally expandable material to the carrier, but this is usually less preferred. The polymeric or resinous composition contains an organic polymer or polymer-forming precursor, and a heat-activatable expanding agent which produces a gas when subjected to a predetermined elevated temperature. Upon heating to a temperature from 120 to 250° C., the polymeric or resinous composition softens or melts, and the expanding agent produces a gas. The gas forms cells in the softened or molten polymer, which causes the thermally expandable material to increase in volume and to form an expanded, cellular material. The expansion is often accompanied by a curing or crosslinking reaction to produce a stable cellular structure in the expanded material.

The polymeric or resinous composition used to make the thermally expandable material may contain additional components, such as activators, catalysts, curing agents, crosslinking agents, fillers, plasticizers, wetting agents, adhesion modifiers or tackifiers, IR absorbers, cell openers, and the like, Polymer and resinous compositions for making thermally expandable material are known. One type of thermally expandable resinous composition includes one or more epoxy resins and one or more epoxy curing agents, in addition to the expanding agent and other components as may be present. Another type of thermally expandable resinous composition reacts and cures to form a polyurethane or polyurea foam; such composition typically contain an isocyanate-terminated prepolymer and one or more isocyanate-reactive materials, in addition to the expanding agent and other component as may be present. A third type of polymeric composition is based on a thermoplastic rubber such as a styrene-butadiene copolymer. Polymeric compositions of this type are described, for example, in WO 2008/043385. Yet another type of useful polymeric composition is based on a polyolefin such as polyethylene or a polyethylene copolymer. Thermally expandable materials of these types are described in U.S. Pat. No. 5,385,951, EP 452 527A1, EP 457 928 A1, WO 01/30906, WO 2007/117663, WO 2007/117664 and WO 2007/249743.

The acoustic absorbing member is conveniently prepared by pre-forming the carrier, and applying the thermally expandable material to the pre-formed carrier. The carrier can be formed using any method that is suitable given the materials of its construction. Metal carriers are conveniently formed by a stamping method, whereas polymeric carriers are more conveniently formed by a molding or extrusion method, followed by further fabrication if necessary. The thermally expandable material is most conveniently applied through an overmolding process or an extrusion process, again followed by further fabrication if necessary. An overmolding process is particularly suitable, as the mold surfaces can be designed to provide all of the necessary surface features required of the thermally expandable material.

The acoustic absorbing members of the various aspects of the invention are useful for forming acoustic and other types of baffling in structural cavities. Structural cavities of particular interest are vehicular components, in which acoustic baffling is wanted to reduce noise in passenger areas of the vehicle. Examples of such vehicular structural cavities include the so-called A-, B- and C-pillars and roof rails of automobiles and trucks, and similar structures.

A baffle is formed by inserting the acoustic baffle member into place within the cavity and then heating the acoustic absorbing member to a temperature sufficient for the thermally expandable material to expand. The acoustic absorbing member is typically oriented transverse to longitudinal dimension of the cavity. In many if not most cases, the cavity will be sealed by the baffle after the thermally expandable material has been expanded.

The acoustic baffle member preferably has approximately the same cross-sectional shape as the cross-sectional shape of the cavity in which it is to be used. The acoustic baffle member may fit snugly within the cavity prior to expansion of the thermally expandable material. In those embodiments, simple friction may be sufficient to hold the acoustic baffle member in place until the expansion step is completed. In other cases, the acoustic baffle member may be smaller in cross-section than the cavity. In such cases, it is usually desirable to affix the acoustic baffle member to the cavity to hold it in place until the expansion step is completed. Mechanical means such as clips, pins and other fasteners can be used. Adhesives can be used for this purpose as well.

The thermally expandable material is expanded by heating the acoustic absorbing member to a temperature of from 120 to 250° C. A preferred expansion temperature is from 140 to 210° C. However, the temperature used in each particular case will of course depend on the composition and expansion characteristics of the polymeric or resinous composition that makes up the thermally expandable material. Typically, these compositions are formulated to expand within a predetermined temperature range.

The heating step is continued until the thermally expandable material expands to form a foam having a volume at least 400% of the initial volume of the thermally expandable material. Expansion is preferably to 1000 to 3500%, more preferably from 2000 to 3000% of the initial volume. If the thermally expandable material must cross-link and/or cure during the expansion step, the temperature and time of the heating step are also sufficient for those processes to occur. Typically, the heating step will require from 5 to 60 minutes, depending on factors such as the particular temperature that is used, the composition of the thermally expandable material, the degree of expansion that is needed, the thickness of the thermally expandable material, and the thermal conductivity of the carrier.

The expanded foam will in most cases cover substantially the entire surface area of the each side of the baffle. In embodiments of the invention in which the carrier has openings as described herein, the expanded foam will cover at least 99%, preferably 100% of the aggregate surface area of such openings. Most preferably, the expanded foam will form a baffle which seals the entire cross-section of the cavity.

It is very convenient and cost-effective in many automotive vehicle assembly environments to conduct the thermal expansion step concurrently with the thermal cure of a coating such as an electrocoating or other finish that requires a bake cure. The coating often provides the assembly with protection against rust and other environmental damage. Because of this, it is important to cover all surfaces of the structure, including the inside of the cavity, with the coating material. This is facilitated when the acoustic baffle member has openings as in the first aspect of this invention. In such cases, the acoustic baffle member can be inserted into the cavity at the desired location during the assembly of the cavity or after the cavity is assembled. The coating can then be applied to the resulting structure. The openings in the acoustic baffle member permit the coating to flow through the cavity and contact interior surfaces of the cavity. This is especially important when both ends of the cavity are to be sealed or when only one end of the cavity is open. Similarly, the openings in the acoustic baffle member permit excess coating to drain easily from the part before it undergoes the bake cure.

The coated material then undergoes a heating step, during which the coating is bake cured and the thermally expandable material is expanded. If openings are present in the acoustic baffle member, they become covered thermally expandable material expands and in that manner seals the cavity. The seal provides acoustical baffling in most cases and can also seal the cavity to prevent liquids such as rainwater from entering the cavity and causing corrosion.

When the acoustic barrier member contains substantially discontinuous sections of the thermally expandable material, a benefit is often seen in that the thermally expandable material expands more uniformly than when the thermally expandable material is all of a piece. It has been found that a certain amount of non-uniform expansion is often experienced when a thermally expandable material is applied to the carrier as a large, continuous layer. This is often the case when overmolding methods are used to make the acoustic barrier member. Breaking the thermally expandable material into discontinuous sections each having a surface area of from 0.25 to 400 mm² has been found to cause a more uniform expansion of the layer. Although the invention is not limited to any theory, it is believed that the non-uniform expansion is caused by a certain amount of non-uniform orientation that occurs when the thermally expandable material is applied. Breaking the material into discontinuous sections restricts that orientation to discrete regions in the material so that, within a section, the differences in orientation are generally smaller. When the discontinuous sections are heated during the expansion step, they are better able to eliminate the remaining orientation before the expanding agent is activated, which leads to more uniform expansion.

The expanded material will in most cases function as an acoustic barrier, whose function is to absorb, reflect or block noise and vibration that is being conducted through the cavity. The expanded material usually performs well as an acoustic barrier material when it contains mainly closed cells. Therefore, it is preferred that the expanded material contains from 50 to 100%, preferably from 75 to 100% closed cells.

What is claimed is:

1. An uncured acoustic absorbing member comprising a thermally inert carrier and applied to the carrier a thermally expandable material which cures and expands to at least 400% of its initial volume when heated to a temperature in the range of from 120 to 250° C. to form an expanded foam,
wherein the carrier includes a wall portion having opposing surfaces, at least one of which opposing surfaces includes raised areas which divide said surface into substantially discontinuous sections that each have a surface area of from 0.25 to 400 mm²;
and wherein at least a portion of the thermally expandable material is applied to at least one surface of the carrier within said substantially discontinuous sections defined by said raised areas to form discontinuous sections of said thermally expandable material on said surface of the carrier.

2. The acoustic absorbing member of claim 1, wherein the carrier has first and second opposing sides and openings extending through the wall portion from the first opposing side to the second opposing side, wherein said openings have a maximum dimension of from 0.5 to 20 mm and wherein said openings constitute in the aggregate from 10 to 75% of the surface area of the wall portion.

3. The acoustic absorbing member of claim 2, wherein at least a portion of said openings have raised opening borders.

4. A method of applying acoustical baffling to a cavity, comprising
a) positioning the uncured acoustic absorbing member of claim 1 transversely within said cavity, and
b) heating the acoustic absorbing member to a temperature of from 120 to 250° C. for a time sufficient for the discontinuous layer of the thermally expandable material to expand by at least 400% of its initial volume and produce on at least one side of the carrier an expanded foam that covers substantially the entire surface area of said side of the carrier.

* * * * *